United States Patent
La Gase et al.

[11] 3,823,255
[45] July 9, 1974

[54] FLAME AND RADIATION RESISTANT CABLE

[75] Inventors: Francis E. La Gase, Utica; Stevan Jovanovitch, Rome, both of N.Y.

[73] Assignee: Cyprus Mines Corporation, Los Angeles, Calif.

[22] Filed: Apr. 20, 1972

[21] Appl. No.: 245,772

[52] U.S. Cl. ...... 174/113 R, 174/121 A, 174/121 B, 174/121 AR, 174/121 SR
[51] Int. Cl. ............................................. H01b 7/02
[58] Field of Search ..... 174/121 A, 121 B, 121 AR, 174/121 SR, 121 R, 113 R

[56] References Cited
UNITED STATES PATENTS

| | | | |
|---|---|---|---|
| 470,924 | 3/1892 | Edison | 174/121 R |
| 1,713,716 | 5/1929 | Saylor | 174/121 A |
| 2,127,122 | 8/1938 | Lamela | 174/121 A |
| 2,187,391 | 1/1940 | Borgeson | 174/121 R |
| 2,335,097 | 11/1943 | Aken | 174/121 A |
| 2,800,524 | 7/1957 | Van Lear | 174/121 R |
| 3,571,490 | 3/1971 | Bunish | 174/113 R |
| 3,576,940 | 5/1971 | Stone | 174/121 A |

Primary Examiner—E. A. Goldberg
Attorney, Agent, or Firm—Harris, Kern, Wallen & Tinsley

[57] ABSTRACT

A flame retardant, radiation resistant insulated conductor, either in single conductor form or having a plurality of insulated conductor assemblies each comprised of an electrical conductor core, a flexible flame-resistant barrier layer of an inorganic electrical insulating material which surrounds the core, an electrical insulating layer of a polymer material which surrounds the barrier layer, a second flame retardant barrier layer of an inorganic electrical insulating material which surrounds the polymer insulating layer, and a second electrical insulating layer of a halogen containing polymer which surrounds the second barrier layer and jackets the insulated conductor. The plurality of insulated conductors are wrapped together, preferably twisted together, within a flame retardant barrier shell of an inorganic electrical insulating material. The shell is jacketed with a flexible flame retardant, electrical insulator covering of a halogen containing polymer.

5 Claims, 2 Drawing Figures

FLAME AND RADIATION RESISTANT CABLE

BACKGROUND OF THE INVENTION

The present invention is directed to a flame retardant and radiation resistant control and power cable for use in power plants and generating stations, in particular, nuclear generating plants. In a nuclear plant or any other plant subject to unexpected high temperature conditions, such as, for example, fires, it is necessary that the power and control cable have a sufficient life when subject to fire and high temperature conditions due to a breakdown in the plant operation, such as occurs in a nuclear generating plant after the loss of coolant, to shut down the plant and make the pile non-critical in order to prevent catastrophies endangering life and property.

The cable assembly disclosed in the early patent literature, such as in the Eaton U.S. Pat. No. 240,106; splitdorf Pat. No. 437,632; Saylor Pat. No. 1,713,716; Studt et al. Pat. No. 1,992,678; Youmans Pat. No. 2,186,442; Hall et al. Pat. No. 2,260,014; Saunders et al. Pat. No. 3,222,219; Ward Pat. No. 3,325,325; and Shelton, Jr. Pat. No. 3,425,865, were not developed to be subject to high temperature flames and high radiation doses, and accordingly, are not satisfactory as control cables and power cables for nuclear generating plants.

At the present time, Anaconda and Okonite manufacture and sell control and power cables for nuclear generating plants which last from 5 to 7 minutes in a 1,400°F. flame from a jet burner. Until applicants' invention, these cables were acceptable fire-resistant control and power cable for use in nuclear generating plants and the like. These cables have single conductor insulated with an ethylenepropylene rubber insulation layer which is jacketed with a neoprene or hypalon coating. Each of the jacketed-insulated conductors are twisted together, wrapped with a tape of an inorganic base material, generally glass or asbestos tape, and coated with an extended jacket of polyvinyl chloride, hypalon, or neoprene. Naturally, the longer life span a cable has under high temperature and flame conditions, the more desirable it is.

Applicants attempted to develop a cable that had a longer life span under such conditions than the present cables available from Anaconda and Okonite. Originally, the applicants wrapped a bare conductor with an inorganic base insulating tape, and unsulated the whole assembly with ethylene-propylene rubber insulation. The plurality of wrapped-insulated conductors were then cabled together, wrapped with silicone or glass tape and covered with a neoprene jacket. The applicants employed the inorganic tape, mica tape, to provide conductor insulation after the outer jacket and inner organic insulation layers were burned away hopefully to give the cable a longer circuit life in a high temperature fire. A ten-foot piece of the cable was fastened to a vertical metal cable tray which was hinged near the point of flame impingement on the cable and each conductor was connected to a 480 voltage circuit system. A high-intensity jet burner was impinged on the cable at about a 30° angle from the vertical and the cable was burned for 30 minutes at a 1,900°F. flame with no loss of circuitry. The flame was removed and the cable tray was flexed 90° at the hinged portion and the cable still retained its circuitry. Again, the flame was turned on the cable for an additional 15 minutes at 1,900°F. before an electrical short finally occurred. At this point, the applicants felt that they had achieved a major breakthrough on a flame retardant cable which markedly outperformed other known fire resistant cable designs. The applicants had to subject each of the single wrapped-insulated conductors of the cable to the ASTM and Underwriters Laboratories' vertical flame test to demonstrate fire protection where the single conductors are fanned out for termination. Since ethylene-propylene rubber or crosslinked polyethylene insulation has little flame resistance, the applicants knew they were going to have to jacket each of the wrapped-insulated conductors with a flame retardant material. Accordingly, each wrapped-insulated conductor was jacketed with neoprene. In theory, this should have insured that the cable and each of the single conductors would pass the ASTM and UL vertical flame test because neoprene exudes hydrochloric acid, phosgene and similar compounds which are fire retardants when neoprene is burned or subjected to high temperatures. The cable was prepared and subjected to the vertical metal ladder test tray test described above. In a 1,900°F. flame, the cables failed in 5 to 8 minutes. This was a complete surprise and quite natuarlly was blamed on faulty manufacture and/or materials. New samples of the cable were made and the same poor results were obtained upon similar testing. At this point, the applicants examined the situation closely and concluded that the flame retardant rubber jacket, neoprene, on the single conductors within the cable was the underlying cause of the premature failures. The applicants felt that the halogenated rubber jacket material formed corrosive gases upon being burned or subjected to high temperatures, which, when confined within the cable attached the underlying inorganic tape, causing tracking, corrosion and early failure. Applicants then attempted to use other flame retardant materials for the jacket, as well as attempting to use single-shot flame resistant insulation in place of the ethylene propylene rubber insulation and halogenated jacket. Unfortunately, the applicants were unable to achieve any better results with the other materials and designs. These other tests and designs merely confirm the applicants' opinion that, when a flame-retardant material, such as a halogen-containing polymer, is confined within the cable during decomposition, the resulting gaseous products cause severe damage to the inorganic base insulating tape, which in turn causes rapid electrical failure. Further experiment by applicants showed that a second inorganic barrier layer applied over the ethylene propylene rubber insulation successfully acted as a barrier which permitted use of halogenated jacket compounds which when burned would not deleteriously affect the inorganic tape applied over the conductor. The result was that such new construction was able, again, to retain its electrical circuitry for 30 to 45 minutes in such a 1,900°F. ladder tray flame test.

SUMMARY OF THE INVENTION

The present invention is a flame-retardant insulated cable having an insulated conductor comprised of an electrical conductor core, a first flexible flame-retardant barrier layer of an inorganic electrical insulating material which surrounds the core, an electrical insulation made of a polymer material which covers the first barrier layer, a second flexible flame-retardant barrier layer of an inorganic electrical insulating material which surrounds the first insulating layer and a second insulating layer of a halogen-containing polymer material which surrounds the second barrier layer and jackets the insulated conductor. Both single and multiconductor cable constructions are comprised in this invention, in multiconductor cables, a plurality of insulated conductors are cabled together and housed within a flexible flame-retardant barrier shell of an inorganic electrical insulating material. The shell of the cable is jacketed with an electrical insulating coating of a halogen-containing polymer material.

DESCRIPTION OF THE PREFERRED EMBODIMENT OF THE INVENTION

Figure 1:
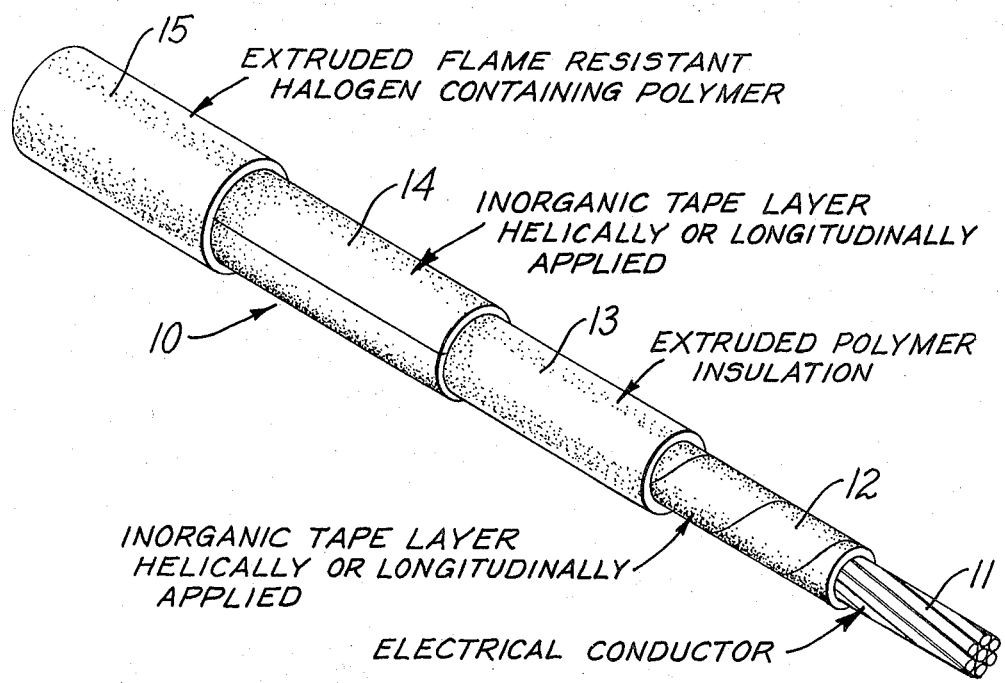
FIG. 1 is an enlarged perspective view of the insulated conductor in accordance with the present invention, with successive layers cut away to show the structure.

A perspective view of an insulated conductor 10 is shown in FIG. 1. The insulated conductor 10 has a central electrical conductor core or wire 11, a first flexible, flame-retardant inorganic barrier layer 12, a flexible, polymer insulating layer 13, a second flexible, flame-retardant inorganic barrier layer 14, and a flexible, flame-retardant, halogen containing polymer layer 15. The conductor core 11 can either be single strand or multi-strand copper, silver or aluminum wire, or the like. The conductor core 11 is surrounded by the barrier layer 12 which is made of an inorganic electrical insulating material. The inorganic materials can be selected from any of the conventional flame-retardant inorganic electrical insulating materials which are employed in the fabrication of cable, such as, for example, mineral wool, spun or fiber glass, asbestos, quartz fiber or mica. Inorganic material can be employed in a variety of forms, such as thread, yarn, cloth or tape. In the cloth or tape form, the inorganic material can be felted, laminated, matted or in the woven state. In many instances the inorganic material will be supported with heat-resistant materials, such as silicone rubber. A suitable inorganic material tape which the applicants have found quite suitable for fabrication of the first barrier layer 12 of the insulated conductor 10 is reconstructed mica, silicon resin impregnated, non-woven, glass-reinforced laminated tape which is available from the General Electric Company, Insulating Materials Department, Schenectady, New York (G.E. standard grade No. 77925, yield: 4.65 sq. yds. per lb.). This material is helically or spirally wound along the length of the conductor core 11 with a lap by means of a conventional taping head. The tape can be applied longitudinally along the conductor core 11 with a fold at the extrusion operation. An inorganic thread (not shown), such as a fiber glass thread, can be applied helically, or spirally, over the folded tape to prevent the tape from opening up at the fold-over lap during a fire.

The first inorganic barrier layer 12 is surrounded with a flexible, insulating layer 13. The layer 13 is made of an electrical insulating polymer material, such as the rubber or synthetic polymers presently used in insulated wire and cable fabrication. Suitable rubbers that can be employed in the fabrication of layer 13 include electrically insulating unvulcanized, vulcanized, or reclaimed natural rubber (NR, polyisoprene polymers), isoprene rubber (IR, polyisoprene polymers), butadiene rubber (BR, polybutadiene polymers), butadiene-styrene rubber (SBR, butadiene-styrene copolymers), butyl rubber (IIR, isobutylene isoprene polymers), ethylenepropylene rubber (EPM and EPDM, ethylenepropylene copolymers and terpolymers), nitrile rubber (NBR, butadiene tadiene acrylonitrile copolymers), epichlorohydrin (ECO, epichlorohydrin polymers and copolymers), neoprene rubber (CR, chloroprene polymers), hypalon rubbers (CSM, chlorosulfonated polyethylene polymers), urethane rubbers (AU, EU, urethane polymers or elastomers), polysulfide or thiokol rubbers (T, organic polysulfide), silicone rubbers (Si, organic silicon polymers), fluoro silicon rubber (FSi, fluorinated organic silicon polymers), fluoro elastomers (SPM, fluorocarbon polymers), acrylic rubbers and polyacrylates (ACM, copolymers acrylic ester and acrylic halide), polyvinyl chloride polymers, polyvinyl fluoride polymers, chlorinated polyethylenes, cross-linked polyethylene polymers, polypropylene polymers, polyamides (see U.S. Pat. No. 3,425,865) and the like. Preferably the polymer material in insulating layer 13 is free of halogen atoms, such as fluorene, chlorine and bromine. The insulation layer 13 can be coated on, extruded, wrapped on as a tape, cloth, yarn, filament or the like. Preferably layer 13 is fabricated by extrusion.

The flexible, flame-retardant barrier layer 14 surrounds the insulating layer 13. The layer 14 is fabricated from a fire-retardant, electrically insulating inorganic material, such as those described above, with respect to material used in the fabrication of the first flexible, flame-retardant barrier layer 12. In FIG. 1, barrier layer 14 is shown as being fabricated with an inorganic material in tape form which is applied longitudinally around the insulating layer 13. Layer 14 could also be fabricated from the inorganic material in tape form, which is spirally or helically wound over the layer 13 and the like.

The flexible, flame-retardant, insulating layer 15 surrounds the second barrier layer 14 and constitutes an outer protective jacket for the insulated conductor 10. The flame-retardant insulating layer 15 is fabricated from a halogen-containing polymer material which has flame resistance or flame-retardant properties. Such materials are described above with respect to the insulating layer 13 and include neoprene rubber, chlorinated polyethylene, chlorosulfated polyethylene, cross-linked polyethylene, polyvinyl chloride polymers, polyvinyl fluoride polymers, Teflon polymers (tetrafluoro ethylene polymers) and modified Teflon polymers, such as Teflon FEP (tetrafluoroethylene-hexafluoropropylene polymers).

Figure 2:
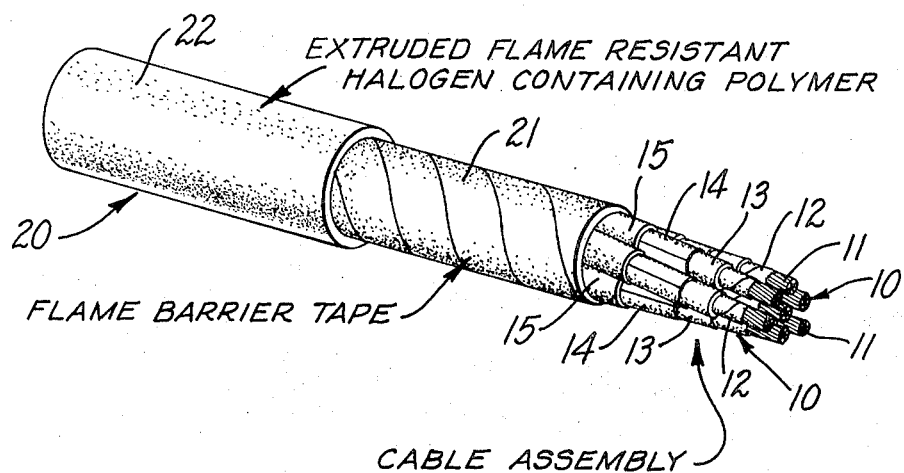
FIG. 2 is a perspective view of the flame-retardant insulated cable assembly of the present invention, with successive layers cut away to show the structure.

In FIG. 2 a perspective view of the flame-retardant insulated cable assembly 20 of the present invention is shown. The conductive core or the cable assembly 20 is made up of a plurality of insulated conductors 10, one of which is illustrated in FIG. 1. As will be noted, each of the elements of the structure of the insulated conductor 10 is identified with the same number in FIG. 2 as in FIG. 1.

The insulated conductors 10 of the cable assembly 20 are cabled together, preferably twisted together, and housed within a flame-retardant barrier shell 21. The flame-retardant barrier shell 21 is fabricated from an inorganic electrical insulating material such as those described above with respect to the first flexible, flame-retardant barrier layer 12, including suitable shells which have been prepared from mica tapes, fiber-glass tapes, glass-reinforced silicone tapes, supported and unsupported asbestos tapes, glass-fiber tapes and silicon tapes which preferably are helically wound about the cable-insulated conductors 10 in a lapped relationship.

The shell 21 is coated with a protective jacket 22. The protective jacket 22 protects the cable assembly from flame, abrasion, and moisture. Preferably jacket 22 is fabricated from a halogen-containing polymer material that has flame-resistant or fire-retardant properties, such as those materials described above with respect to the insulating layer 13. Suitable materials include neoprene rubber and hypalon rubber, polyvinyl fluoride, or chlorinated polyethylene. The outer protective jacket can be made from a sheet of a halogen-containing rubber material which is applied longitudinally along the cable assembly, or can be a tape made of a halogen-containing polymer material which is helically wrapped about the cable in a lapped relationship or, preferably, the halogen-containing polymer material is a thermoset polymer which can be extruded about the shell 21 to provide a tough, durable, moisture-resistant borderless sheath for the cable assembly 20.

The above described cable of FIG. 2 has been subjected to the flame test described above in the "Background of the Invention." When subjected to the 1,900°F. vertical cable tray flame test, he cable 20 readily passed the one-half hour flame test and the flexing test without circuit failure. It is believed that when such cable is subjected to the flame test, the flame eventually burns its way through the protective coating 22, through the flame barrier tape 21, through the flame retardant insulation layers 15 of the insulated conductors 10, through the barrier tapes 14, and through the flexible insulating layers 13, or some of them. The corrosive gases given off by the burning halogen-containing polymer material in protective layer 22 and in the insulating layers 15 are prevented from damaging the first barrier layers 12 by the blocking effect of inorganic layers 14. Of course in any such flame test of the multiconductor cable 20, some but not all of the layers of the constituent conductors 10 may be flame affected. When the burnt cable assembly 20 is flexed, it appears that the first barrier layers 12 have sufficient integrity to prevent shorting between adjacent burnt insulated conductors 10 even though the insulating layer 13, barrier layer 14 and insulating layer 15 of each burnt insulated conductor 10 no longer provide protection. It can be seen from the above discussion, that the above-described cable can withstand flames and temperatures of more than 500°F. higher than the presently used flame-resistant cables and can maintain its circuit integrity for periods up to 6 times longer.

What we claim as our invention is:

1. A flame and radiation resistant cable assembly having: an insulated conductor with an electrically conductive core; a first flexible flame-retardant barrier layer surrounding said core; a flexible, insulating layer surrounding said first barrier layer; a second flame-retardant barrier layer surrounding said flexible insulating layer; and a flexible flame-retardant, insulating layer surrounding said second barrier layer and jacketing the insulated conductor, said assembly including a plurality of said insulated conductors; a flexible, flame-retardant barrier shell in which said insulated conductors are cabled; and a protective jacket surrounding said shell.

2. The flame and radiation resistant cable assembly as defined in claim 1, wherein said flexible, flame-retardant barrier shell is fabricated from an electrical insulating, flame-retardant inorganic material.

3. The flame and radiation resistant cable assembly as defined in claim 1, wherein said protective jacket is fabricated from a flame-retardant halogen-containing polymer material.

4. The flame and radiation resistant cable assembly as defined in claim 1, wherein said barrier shell is fabricated from mica, asbestos, fiber glass, spun glass, mineral wool, quartz fiber, or silicone.

5. The flame and radiation resistant cable assembly as defined in claim 1, wherein said protective jacket is fabricated from neoprene rubber, hypalon rubber, fluoro silicon rubber, fluoro elastomers, polyvinyl chloride, polyvinyl fluoride, chlorinated polyethylene, crosslinked polyvinyl chloride, or crosslinked polyethylene.

* * * * *

UNITED STATES PATENT OFFICE
CERTIFICATE OF CORRECTION

Patent No. 3,823,255  Dated July 9, 1974

Inventor(s) Francis E. LaGase and Stevan Jovanovitch

It is certified that error appears in the above-identified patent and that said Letters Patent are hereby corrected as shown below:

Column 1, line 9, after "any" delete "other"
(page 2, line 5)

Column 1, lines 19, 20, "splitdorf" should be --Splitdorf--
(page 2, line 15)

Column 1, line 22, "2,260,014" should be --2,260,024--
(page 2, line 18)

Column 1, line 41, "extended" should be --extruded--
(page 3, line 9)

Column 1, line 49, "unsulated" should be --insulated--
(page 3, line 17)

Column 2, line 24, "natuarlly" should be --naturally--
(page 5, line 5)

Column 2, line 36, "attached" should be --attacked--
(page 5, line 15)

Column 3, line 49, "reconstructed" should be --reconstituted--
(page 8, line 8)

Column 5, line 32, "he" should be --the--
(page 12, line 14)

Column 6, line 21, Claim 1, after "flexible" insert --,--
(Claim 1, line 8 of amendment dated 6-23-73)

Signed and sealed this 29th day of October 1974.

(SEAL)
Attest:

McCOY M. GIBSON JR.
Attesting Officer

C. MARSHALL DANN
Commissioner of Patents